United States Patent [19]

Deutschmann et al.

[11] 4,106,444
[45] Aug. 15, 1978

[54] INDIVIDUAL CYLINDER HEAD

[75] Inventors: Herbert Deutschmann; Karl Schier, both of Friedrichshafen, Germany

[73] Assignee: Motoren-und Turbinen-Union Friedrichshafen GmbH, Germany

[21] Appl. No.: 672,282

[22] Filed: Mar. 31, 1976

[30] Foreign Application Priority Data

Apr. 3, 1975 [DE] Fed. Rep. of Germany ....... 2514592

[51] Int. Cl.² ............................................. F02F 1/36
[52] U.S. Cl. .................... 123/41.82 R; 123/193 H; 123/32 C; 123/41.76; 123/41.85
[58] Field of Search ........ 123/193 H, 193 CH, 193 R, 123/41.82, 188 S

[56] References Cited

U.S. PATENT DOCUMENTS

| | | | |
|---|---|---|---|
| 1,107,946 | 8/1914 | Hesselman | 123/193 H |
| 1,151,736 | 8/1915 | Taylor | 123/193 CH |
| 1,180,983 | 4/1916 | Daiber | 123/193 CH |
| 1,744,184 | 1/1930 | Wahlberg | 123/193 R |
| 1,803,263 | 4/1931 | Lang | 123/193 R |
| 2,234,780 | 3/1941 | Rippingille | 123/193 CH |
| 3,115,126 | 12/1963 | Spencer | 123/188 S |
| 3,125,082 | 3/1964 | Stansfield | 123/188 S |
| 3,176,666 | 4/1965 | Whitehead | 123/193 R |

*Primary Examiner*—Clarence R. Gordon
*Attorney, Agent, or Firm*—Craig & Antonelli

[57] ABSTRACT

A liquid-cooled individual cylinder head for piston internal combustion engines with two inlet valves and two outlet valves arranged respectively adjacent one another, which consists of a cast upper part and of a double-walled bottom between the upper part and the combustion space, which is provided with apertures for the valves and for an injection nozzle or a pre-chamber; the bottom extends over the entire surface of the cylinder head upper part up to the outer boundary thereof while the lower surface of the upper part and both surfaces of the bottom are constructed planar; the two parts of the bottom are supported with respect to one another by wall portions or ribs within an annular zone in the area of the support of the bottom on the cylinder head seal while several cooling medium inlet openings are distributed in the lower wall of the double-walled bottom between the annular zone and an outer boundary.

30 Claims, 5 Drawing Figures

INDIVIDUAL CYLINDER HEAD

The present invention relates to a liquid-cooled individual cylinder head assembled of several parts for piston internal combustion engines with two inlet valves and two outlet valves arranged respectively adjacent one another, consisting of a cast upper part and of a double-walled bottom assembled of two parts and arranged between this upper part and the combustion space, whereby the double-walled bottom is provided with apertures for the valves and for an injection nozzle or for a pre-chamber and cooling liquid spaces are formed in the double-walled bottom by recesses in one or both parts.

The cylinder output of reciprocating piston internal combustion engines has continuously increased in the last few years with the same stroke volume by raising the charging pressures and by increasing the internal combustion engine rotational speed. The higher thermal and mechanical loads connected therewith become noticeable in an undesirable and sometimes troublesome manner especially at the cylinder heads which are constructed in a complicated manner by the installations for the gas exchange and the fuel supply. The aim of the present invention resides in attaining or exceeding the heretofore achieved service lives of cylinder heads under the described increased loads in a manner that is as economical as possible.

Cylinder heads have been proposed, for example, in German Pat. No. 286,319, in which a double-walled bottom assembled of two parts is arranged in a recess of the cylinder head upper part. The double-walled bottom is thereby to take over the thermal load whereas the upper part is intended to absorb the working pressures and the bolt forces. Disadvantageous with this prior art arrangement are the machining of the recesses in the cylinder head upper part unfavorable for the manufacture, the dimensional matching of the recess depth to the thickness of the bottom and the occurring sealing and feed problems for the cooling liquid.

It is the aim of the present invention to simplify the machining operations during the manufacture of such cylinder heads and therewith to reduce the costs, to assure the tightness of the transitions and spaces carrying cooling liquid with respect to the outside, the cylinder space and the gas-conducting channels and to assure nonetheless in connection therewith the safe support and absorption of the occurring high forces between cylinder crankcase and cylinder head.

The underlying problems are solved according to the present invention in that the double-walled bottom extends over the entire lower surface of the cylinder head upper part up to the outer boundary thereof, the lower surface of the upper part and both surfaces of the bottom are constructed planar, the two parts of the bottom are supported with respect to one another by wall parts or ribs within a ring zone in the area of the support of the bottom on the cylinder head seal and several cooling medium inflow openings are distributed in the lower wall between the annular zone and an outer boundary of the bottom.

The advantage of the present invention resides in that both the cylinder head upper part and also the cylinder head bottom can be accurately machined at their sealing surfaces to given dimensions and tolerances by simple manufacturing operations such as, for example, milling and grinding. Controllable transitions from the cylinder crankcase into the bottom result for the cooling liquid and the possibility for the conduction of the cooling liquid to the heat-endangered places in the cylinder head bottom which is matched to the requirements of the heat removal, is realizable by the present invention.

A good cooling of the entire wall of the bottom lying above the cylinder space is assured in that the cooling liquid spaces are delimited essentially by the supporting wall parts and the annular walls of the apertures and in that the rib each is arranged between the annular wall of each valve aperture and the supporting wall parts, which subdivide the cooling liquid spaces into two outer cooling channels and a center cooling channel.

An intensive cooling at a part of the heat-endangered webs between the valves is realized by large quantities of cooling liquid in that each of the two outer cooling channels extends along and on the inside of the annular zone about two valve apertures each and in that each of the two outer cooling channels is connected with the center cooling channel through the hollow webs between these valve apertures, and in that one-half of the cooling medium supply openings terminate in each of the two outer cooling channels. The same advantages of an intensive cooling by large cooling liquid quantities is achieved for the remaining webs and for the aperture of the injection nozzle or pre-chamber in that the center cooling channel surrounds the aperture for the injection nozzle or pre-chamber and in that the center cooling channel extends in two opposite directions through the two remaining hollow webs between the valve apertures up to the supporting wall parts and one cooling medium discharge opening each into the upper part of the cylinder head is arranged in the upper wall of the bottom near these wall parts.

An intensive conduction of the cooling liquid to the annular walls of the valve apertures is possible in that according to another feature of the present invention, a wedge-shaped rib or wall part projects in the center of each outer cooling channel from the outer, essentially circularly-shaped boundary thereof in the direction toward the hollow web between the two valve apertures. The collection of vapor bubbles is effectively prevented according to another feature of the present invention in that the ribs subdividing the cooling liquid spaces are provided with apertures of slight cross section.

A still more pronounced cooling of the injection nozzle can be attained according to the present invention in that a sleeve for receiving the injection nozzle and for screwing the bottom together with the upper part is arranged on the top side of the bottom above the aperture for the injection nozzle whereby openings or apertures are provided in the sleeve for conducting the cooling liquid from the center channel into the sleeve while further apertures are arranged in the wall of the sleeve which lead to the cooling liquid spaces of the upper part of the cylinder head.

Different possibilities exist in accordance with the present invention for the manufacture of the bottom. For example, the bottom may be assembled of a lower wall with formed-in cooling liquid spaces and of an upper wall flat or plane or both sides. In the alternative, the upper wall which is flat or plane on both sides may be inserted with a circular configuration corresponding approximately to the cylinder head seal into a corresponding recess of the lower wall. These two types of construction are suitable in particular for a brazed or welded assembly of, for example, drop-forged lower walls with the upper wall that is plane on both sides. On the other hand, cooling liquid spaces up to half their depth may be machined into each of the two walls of the bottom whereby the walls are constructed symmetrical in relation to a main axis and identical with respect to each other and are assembled with their surfaces containing the cooling spaces facing one another. This type of construction is suitable in particular with the manufacture of the wall according to the electrolytic refining process (with high-resistant wall materials).

A still better seal between the upper part and the bottom of the cylinder head is achieved in that a sealing ring is arranged between the upper part and the bottom within a circularly-shaped groove in the upper part with a diameter corresponding approximately to the cylinder head seal. A gas escape toward the outside is prevented with certainty by the incorporation of all gas-exchange channels into the space enclosed by the sealing ring.

In order to prevent the occurrence of fretting corrosion as a result of micro-movements between the bottom and the upper part by reason of temperature and material differences, the present invention proposes that the bottom surface abutting at the upper part or the lower surface of the upper part be covered with a coating layer preventing fretting corrosion, for example, of appropriate synthetic resinous material or suitable metal.

These and other objects, features and advantages of the present invention will become more apparent from the following description when taken in connection with the accompanying drawings which show, for purposes of illustration only, several embodiments in accordance with the present invention, and wherein.

Figure 2:
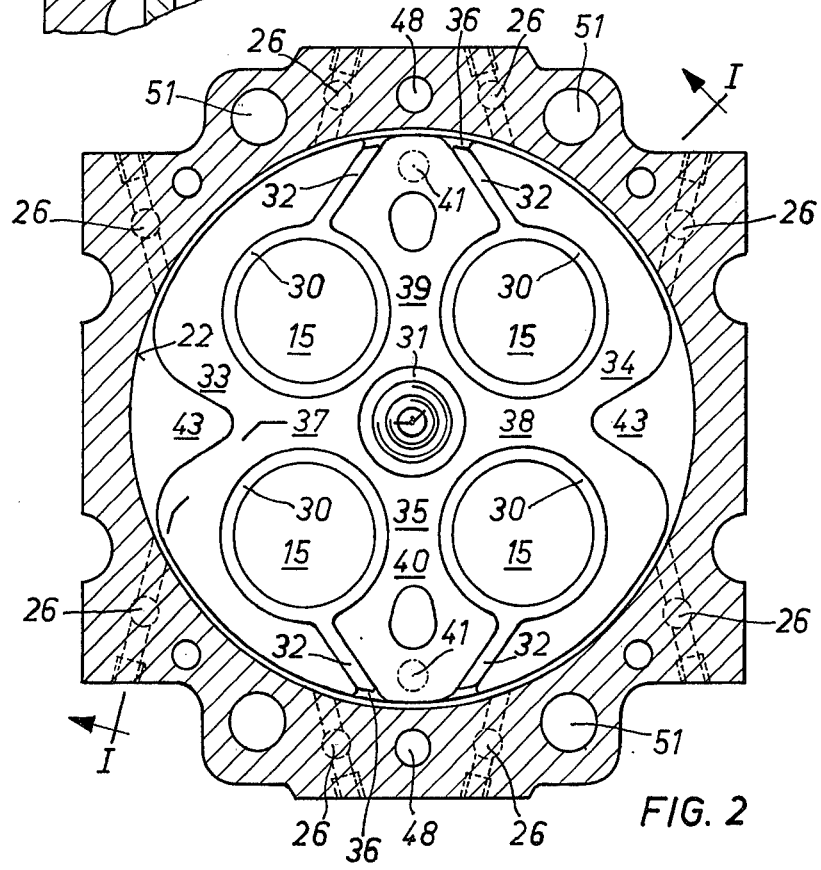
FIG. 2 is a horizontal cross-sectional view through a bottom with cooling medium supply according to the present invention, taken along line II—II of FIG. 1.
Figure 3:
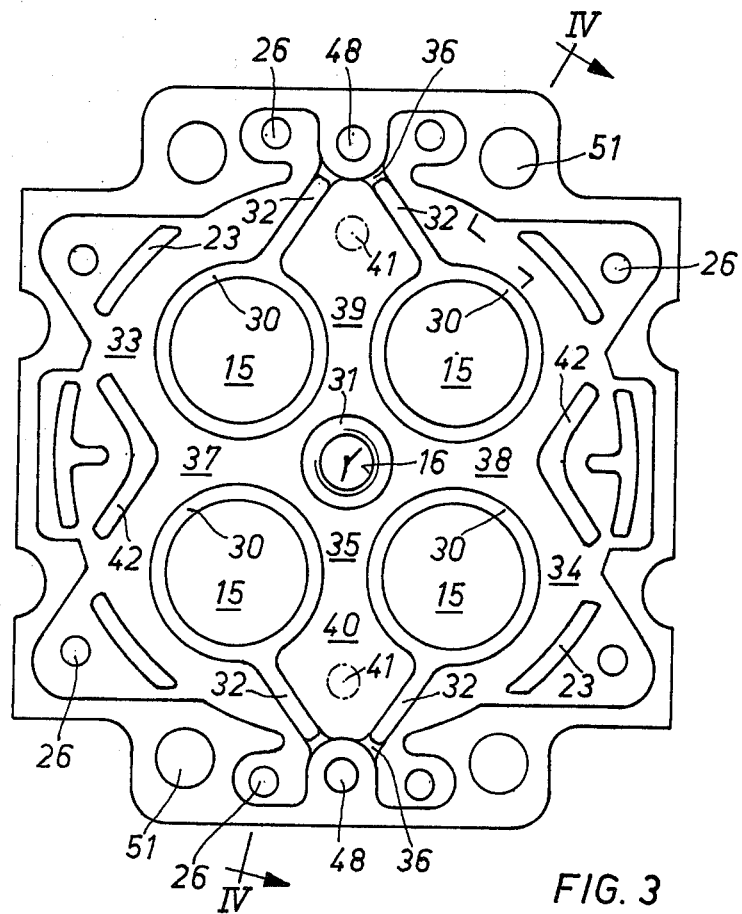
FIG. 3 is a horizontal cross-sectional view through a modified embodiment of a bottom with cooling medium supply, taken along line III—III of FIG. 4.
Figure 4:
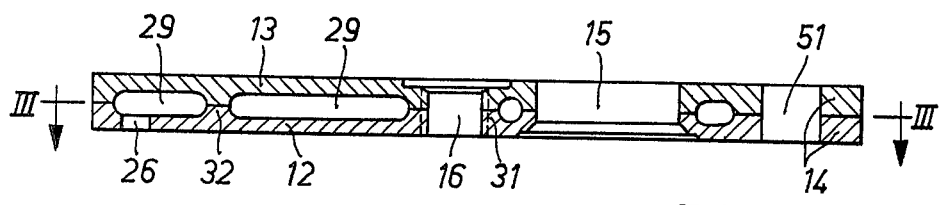
FIG. 4 is a longitudinal cross-sectional view through a modified embodiment of the bottom construction taken along line IV—IV of FIG. 3.
Figure 5:
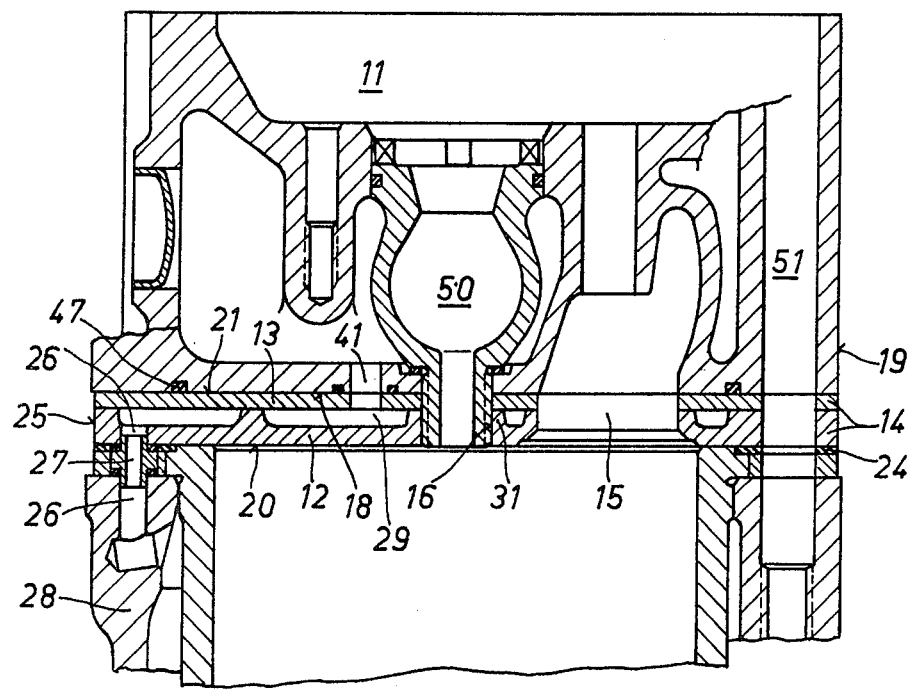
FIG. 5 is a longitudinal cross-sectional view through a cylinder head according to the present invention equipped with a pre-chamber.

Referring now to the drawings wherein like reference numerals are used throughout the various views to designate like parts, a liquid-cooled individual cylinder head for a Diesel engine consists in the various figures of a cast upper part 11 and of a double-walled bottom 14 assembled of two parts 12 and 13 and provided with apertures 15 for the valves and with a further aperture 16 for an injection nozzle (not shown) or for a pre-chamber 50 (FIG. 5). According to the present invention, the bottom 14 extends over the entire lower surface 18 of the upper part up to the outer boundary 19 thereof (FIG. 1) and is constructed planar, i.e., flat on both of its surfaces 20 and 21. The two parts 12 and 13 of the bottom 14 are supported with respect to one another by wall parts 22 (FIG. 2) and ribs 23 (FIG. 3) within an annular zone in the area of the support of the bottom 14 on a cylinder head seal 24. Several cooling medium inflow openings 26 (FIGS. 1 to 4) are distributed in the lower wall of the bottom 14 between the annular zone and an outer boundary 25 (FIG. 1) of the bottom, into which the cooling liquid is conducted directly from a cylinder crankcase 28 by way of intermediate pipes 27 (FIG. 1).

Cooling liquid spaces are formed by recesses 29 in the part 12 of the bottom (FIG. 1 and FIG. 5) or in both parts 12 and 13 of the bottom (FIG. 4). These cooling liquid spaces are delimited essentially by the supporting wall parts 22 and ribs 23 and by annular walls 30 and 31 of the valve apertures 15 and of the aperture 16 for the injection nozzle or pre-chamber, respectively. One rib 32 each (FIGS. 2, 3, and 4) is arranged respectively between the annular walls 30 and the supporting wall parts 22 or ribs 23, which subdivide the cooling liquid spaces into two outer cooling channels 33 and 34 (FIGS. 2 and 3) and into a center cooling channel 35. These ribs 32 are provided with apertures 36 (FIGS. 2 and 3) of slight cross section in order to prevent the collection of vapor bubbles in dead corners of the cooling liquid spaces. Each of the two outer cooling channels 33 and 34 extends along and inside of the annular zone about two valve apertures each and is connected with the center cooling channel 35 through the hollow webs 37 and 38. One-half of the cooling medium inlet openings 26 terminate in each outer cooling channel 33 and 34. The center cooling channel 35 surrounds the aperture 16 for the injection nozzle or pre-chamber and extends in two opposite directions through the two remaining hollow webs 39 and 40 between the valve apertures up to the supporting wall parts. At the location of these wall parts, one cooling medium discharge opening 41 each (FIGS. 2 and 3) leading to the upper part is arranged in the upper wall 13 of the bottom 14. A wedge-shaped rib or wall part 42 (FIG. 3) and 43 (FIG. 2) projects in the center of each outer cooling channel 33 and 34 in the direction of the hollow webs 37 and 38. As a result thereof, the cooling liquid is conducted more intensively to the annular walls of the valve apertures.

Figure 1:
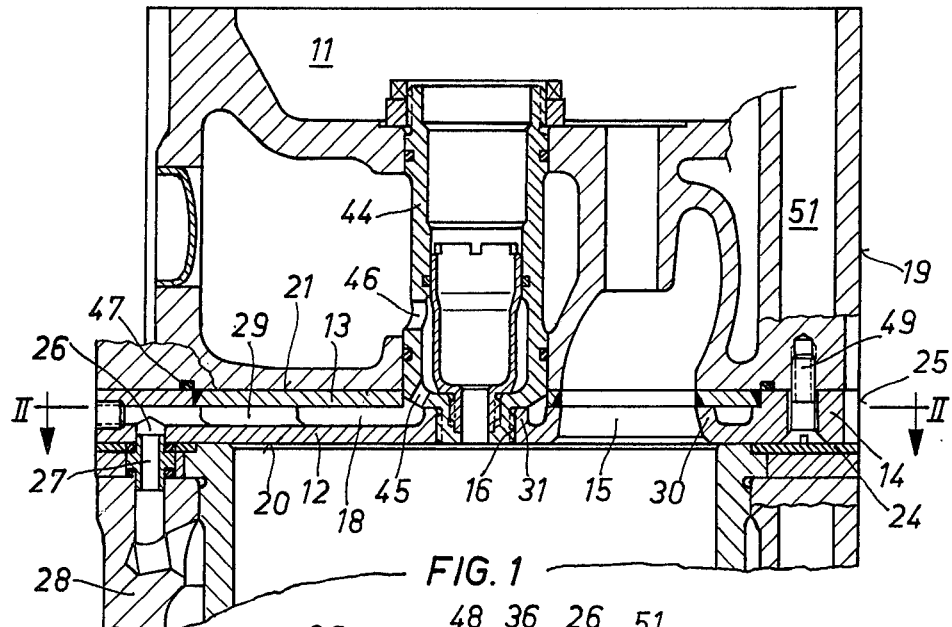
FIG. 1 is a longitudinal cross-sectional view through a cylinder head according to the present invention for direct injection of the fuel into the cylinder space, taken along line I—I of FIG. 2.

A sleeve 44 for the accommodation of the injection nozzle and for screwing the bottom together with the upper part 11 is affixed to the top side of the bottom over the aperture 16 for the injection nozzle (FIG. 1). For purposes of an improved cooling of the injection nozzle, the sleeve 44 is provided with apertures 45 for the cooling liquid. Further apertures 46 lead from the sleeve 44 into the cooling liquid spaces of the upper part 11.

For purposes of connecting the bottom 14 with the upper part 11, possibly also a pre-chamber 50 (FIG. 5) may be used in a similar manner as the sleeve 44. Additionally, the exact fixing and connection can take place by fitting pins in the bores 48 (FIGS. 2 and 3) and by connecting bolts 49 (FIG. 1). These connecting bolts 49 serve primarily the purpose of holding together of the bottom 14 and upper part 11 when the cylinder head is not yet assembled on the cylinder crankcase, for example, when stocked or stored. A further compressing of the sealing surfaces between the upper part and the bottom and the connection with the cylinder crankcase takes place by way of cylinder head bolts (not shown) which extend through the bores 51 (FIGS. 1, 2, 3, and 5) and are arranged inside of the outer boundaries 25 and 19.

A sealing ring 47 is arranged within the upper part 11 in a circular groove having a diameter corresponding approximately to the cylinder head seal, which additionally seals off all gas-exchange channels against the outside.

A part 13 is flat on both sides and is illustrated as upper part of the bottom 14 in FIG. 1 which is inserted circularly-shaped with a diameter corresponding approximately to the cylinder head seal into a corresponding recess of the lower part 12. This construction can be realized in a simple manner and results in low manufacturing costs.

In FIG. 5, a part 13 flat on both sides is illustrated as upper part of the bottom 14, which extends over the entire surface of the bottom. As a result thereof, a good cooling of the entire bottom surface can be achieved by the construction of the cooling medium spaces corresponding to FIG. 3.

In FIG. 4, the cooling liquid spaces 29 are machined into both parts 12 and 13 of the bottom up to half their depth. It is possible by the walls constructed symmetrically in relation to a main axis to construct both wall parts identically in the interest of an economical manufacture.

While we have shown and described several embodiments in accordance with the present invention, it is understood that the same is not limited thereto, but is susceptible of numerous changes and modifications as known to those skilled in the art, and we therefore do not wish to be limited to the details shown and described herein but intend to cover all such changes and modifications as are encompassed by the scope of the appended claims.

We claim:

1. A liquid-cooled cylinder head assembled of several parts for piston internal combustion engines having two inlet and outlet valves respectively arranged adjacent one another, the liquid-cooled cylinder head comprises a cast upper part and a double-walled bottom means between said upper part and a combustion space, said double-walled bottom means being provided with aperture means for valves and for one of an injection nozzle and a pre-chamber, and cooling liquid space means being formed in said double-walled bottom means, characterized in that the double-walled bottom means extends substantially over an entire lower surface of the cylinder head upper part essentially up to an outer boundary thereof, in that a lower surface of the upper part and upper and lower surfaces of the double-walled bottom means are constructed substantially planar, in that upper and lower wall portions of the double-walled bottom means are supported with respect to one another by support means within an annular zone in an area of the support of the double-walled bottom means on a cylinder head seal, and in that several cooling medium inlet openings are distributed in the lower wall portion of the double-walled bottom means between the annular zone and an outer boundary of the double-walled bottom means.

2. A cylinder head according to claim 1, characterized in that the cylinder head is an individual cylinder head.

3. A cylinder head according to claim 2, characterized in that the support means includes at least one of supporting wall portions and rib means.

4. A cylinder head according to claim 1, characterized in that the cooling liquid space means are formed by recess means in one of the upper and lower wall portions of the double-walled bottom means.

5. A cylinder head according to claim 1, characterized in that cooling liquid space means are formed by recess means in both the upper and lower wall portions of the double-walled bottom means.

6. A cylinder head according to claim 3, characterized in that the cooling liquid space means are delimited essentially by the supporting wall portions and by annular wall means of the aperture means in that a rib means is arranged between the annular wall means of each valve aperture means and the supporting wall portions, for subdividing the cooling liquid space means into two outer cooling channels and a central cooling channel.

7. A cylinder head according to claim 6, characterized in that each of the two outer cooling channels extends along and inside the annular zone about two valve aperture means and is connected through hollow web means between said valve aperture means with the central cooling channel, and in that one-half of the cooling medium inlet openings terminate in each of the two outer cooling channels.

8. A cylinder head according to claim 7, characterized in that the central cooling channel surrounds an aperture means for one of the two parts consisting of injection nozzle and pre-chamber and extends in two substantially opposite directions through two other hollow web means between the valve aperture means up to the supporting wall portions, and in that one cooling medium discharge opening means into the upper part is arranged in the upper wall portion of the double-walled bottom means near said supporting wall portions.

9. A cylinder head according to claim 8, characterized in that a wedge-shaped means projects in the center of each outer cooling channel from an outer essentially circularly-shaped boundary are of in the direction toward the hollow web means between the two valve aperture means.

10. A cylinder head according to claim 9, characterized in that the wedge-shaped means is a rib.

11. A cylinder head according to claim 9, characterized in that the wedge-shaped means is a wall part.

12. A cylinder head according to claim 9, characterized in that the wedge-shaped means subdivides the cooling liquid space means and are provided with aperture means of slight cross section.

13. A cylinder head according to claim 12, characterized in that a sleeve means for receiving the injection nozzle and for threadably connecting the double-walled bottom means with the upper part is affixed on the upper surface of the double-walled bottom means above the aperture means for an injection nozzle, said sleeve means being provided with aperture means for the cooling liquid from the central cooling channel, and in that further aperture means are provided in the wall of the sleeve means for supplying coolant to cooling liquid spaces of the upper part.

14. A cylinder head according to claim 13, characterized in that the double-walled bottom means is assembled of a lower wall with formed-in cooling liquid spaces and of an upper wall flat on both sides thereof.

15. A cylinder head according to claim 14, characterized in that the upper wall portion of the double-walled bottom means is flat on both sides and circularly-shaped with a diameter corresponding approximately to the cylinder head seal, and in that a recess is provided in the lower wall portion for receiving the upper wall portion.

16. A cylinder head according to claim 13, characterized in that the cooling liquid space means are machined into each of the two walls of the bottom means up to half a depth thereof, in that the walls are constructed symmetrically in relation to a main axis and identical with respect to one another and are assembled with the surfaces containing the cooling space means facing one another.

17. A cylinder head according to claim 13, characterized in that a sealing ring having a diameter corresponding approximately to the cylinder head seal is arranged between the upper part of the bottom means within a circularly shaped groove in the upper part.

18. A cylinder head according to claim 13, characterized in that a protective layer preventing fretting corrosion is coated on one of the two surfaces consisting of the upper surface of the double-walled bottom means abutting at the upper part and the lower surface of the upper part.

19. A cylinder head according to claim 18, characterized in that said protective layer consists of a material selected from the group consisting of synthetic resinous material and metal.

20. A cylinder head according to claim 1, characterized in that the cooling liquid space means are delimited essentially by the support means and by annular wall means of the aperture means and in that a rib means is arranged between the annular wall means of each valve aperture means and the support means, for subdividing the cooling liquid space means into two outer cooling channels and a central cooling channel.

21. A cylinder head according to claim 20, characterized in that each of the two outer cooling channels extend along and inside the annular zone about two valve aperture means and is connected through hollow web means between said valve aperture means with the central cooling channel, and in that one-half of the cooling medium inlet openings terminate in each of the two outer cooling channels.

22. A cylinder head according to claim 20, characterized in that the central cooling channel surrounds an aperture means for one of the two parts consisting of injection nozzle and pre-chamber and extends in two substantially opposite directions through two other hollow web means between the valve aperture means up to the support means, and in that one cooling medium discharge opening means into the upper part is arranged in the upper wall portion of the double-walled bottom means near said support means.

23. A cylinder head according to claim 20, characterized in that a wedge-shaped means projects in the center of each outer cooling channel from an outer essentially circularly-shaped boundary thereof in a direction toward the hollow web means between the two valve aperture means.

24. A cylinder head according to claim 23, characterized in that the wedge-shaped means subdivides the cooling liquid space means and are provided with aperture means of slight cross section.

25. A cylinder head according to claim 1, characterized in that a sleeve means for receiving the injection nozzle and for threadably connecting the double-walled bottom means with the upper part is affixed on the upper surface of the double-walled bottom means above the aperture means for an injection nozzle, said sleeve means being provided with aperture means for the cooling liquid from the central cooling channel, and in that further aperture means are provided in the wall of the sleeve means for supplying coolant to cooling liquid spaces of the upper part.

26. A cylinder head according to claim 1, characterized in that the double-walled bottom means is assembled of a lower wall with formed-in cooling liquid spaces and of an upper wall flat on both sides thereof.

27. A cylinder head according to claim 26, characterized in that the upper wall portion of the double-walled bottom means is flat on both sides and circularly-shaped with a diameter corresponding approximately to the cylinder head seal, and in that a recess is provided in the lower wall portion for receiving the upper wall portion.

28. A cylinder head according to claim 1, characterized in that the cooling liquid space means are machined into each of the two walls of the bottom means up to half a depth thereof, in that the walls are constructed symmetrically in relation to a main axis and identical with respect to one another and are assembled with the surfaces containing the cooling space means facing one another.

29. A cylinder head according to claim 1, characterized in that a sealing ring having a diameter corresponding approximately to the cylinder head seal is arranged between the upper part of the bottom means within a circularly-shaped groove in the upper part.

30. A cylinder head according to claim 1, characterized in that a protective layer preventing fretting corrosion is coated on one of the two surfaces consisting of the upper surface of the double-walled bottom means abutting at the upper part and the lower surface of the upper part.

* * * * *